(12) United States Patent
Athas et al.

(10) Patent No.: US 8,330,417 B2
(45) Date of Patent: Dec. 11, 2012

(54) POWER SOURCE HAVING A PARALLEL CELL TOPOLOGY

(75) Inventors: William Athas, San Jose, CA (US); Thomas Charles Greening, San Jose, CA (US); Steven Charles Michalske, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/423,577

(22) Filed: Mar. 19, 2012

(65) Prior Publication Data

US 2012/0176098 A1 Jul. 12, 2012

Related U.S. Application Data

(63) Continuation of application No. 12/032,513, filed on Feb. 15, 2008, now Pat. No. 8,143,851.

(51) Int. Cl.
*H02J 7/00* (2006.01)
*H02J 7/04* (2006.01)

(52) U.S. Cl. ......... 320/117; 320/138; 320/121; 320/140
(58) Field of Classification Search .................. 320/116, 320/117, 121, 138, 141
See application file for complete search history.

(56) References Cited

U.S. PATENT DOCUMENTS 6,498,957 B1 * 12/2002 Umetsu ........................... 700/22
8,089,242 B2 * 1/2012 Loudot .......................... 320/101

* cited by examiner

*Primary Examiner* — M'Baye Diao
(74) *Attorney, Agent, or Firm* — Park, Vaughan, Fleming & Dowler LLP (57) ABSTRACT

A power source with multiple cells connected in parallel to a common node or power supply point. The individual cells within the power source may also have a dedicated controller for each of the individual cells. Additionally, a system controller is coupled to each controller in a feedback loop and is configured to selectively connect each cell of the plurality of cells to a power bus to control the discharge of each of the plurality of cells.

20 Claims, 4 Drawing Sheets

POWER SOURCE HAVING A PARALLEL CELL TOPOLOGY

CROSS-REFERENCE FOR RELATED APPLICATIONS

This application is a continuation patent application of U.S. patent application Ser. No. 12/032,513, filed Feb. 15, 2008 and titled "Power Source Having a Parallel Cell Topology," the disclosure of which is hereby incorporated herein by reference in its entirety.

TECHNICAL FIELD

The present invention generally relates to electronic devices and more specifically to a power source for electronic devices.

BACKGROUND DISCUSSION

Many electronic devices use portable power sources such as a cell or a battery. As used herein, the term "cell" refers generally to any power source that may store energy and furnish the stored energy as an electrical voltage and the term "battery" refers generally to multiple cells. Furthermore, cells and batteries may be electrostatic or electrochemical in nature.

Electronic devices are increasingly able to execute multiple functions simultaneously, thereby increasing the power demand of the device and accordingly, the importance of the runtime and lifetime of the battery. For example, laptop computers require increasing amounts of power as more functions are simultaneously used such as DVD-ROMs, wireless networking cards, the processor and the screen. Although there are currently ways to increase the battery runtime such as adjusting the brightness of your screen to a lower intensity, these solutions function within the confines of current power source limitations.

Typical modern battery designs are composed of cells connected in series and parallel combinations. For example, a common configuration of lithium-polymer cells is a three in series, two in parallel configuration. Multiple cells within a battery are often used to extend the battery runtime or simply to meet the power demand of the device. The device may therefore draw power from the cells within the battery simultaneously to meet the power draw demand.

A primary goal of battery management is to estimate the remaining battery capacity. The state of charge of each cell is the cell's remaining capacity, expressed as a percentage. For example, a fully charged cell has a state of charge of 100%, and a fully discharged cell has a state of charge of 0%. Estimation of the state of charge may be referred to as the cell management unit function.

One technique for determining the state of charge is to measure the cell's open circuit voltage. After temperature correction, the open circuit voltage of the cell may provide a reasonable estimate of the state of charge for a given cell chemistry. However, this technique is only useful when the cell is not being charged or discharged. Accordingly, the correlation of open circuit voltage to state of charge may improve as the cells are allowed to rest for longer periods of time.

Another technique for measuring the state of charge is the coulomb counting technique. The coulomb counting technique may be used if a rested cell is not available for measurement. The coulomb counting technique estimates the state of charge by accumulating the amount of charge entering or leaving the battery, as measured by a sense resistor in series with the battery. This technique uses a dead-reckoning algorithm where small errors accumulate with time. Consequently, in an environment where a battery is not allowed to rest, the error in the state of charge estimate will be significant.

Additionally, the state of charge may be used for monitoring cells to assist in controlling the charge of each individual cell in a multiple cell battery. One of the objectives in managing the power draw from a battery with cells in series may be to equalize the state of charge of the individual cells. Failure to equalize or balance the state of charge of individual cells with one another in a battery with cells in series may lead to reduced capacity of the battery. For instance, when charging, the cell with the highest state of charge will terminate charging before other cells are fully charged. Similarly when discharging, the cell with the least charge disables the battery even when other cells still have charge. For this reason, the capacity of a battery with imbalanced cells is less than the sum of the capacities of the individual cells. There are many techniques to address balancing of cells, either by balancing during the charging stage or constant rebalancing between cells, but these techniques often rely on either accurate estimates of cell impedance or state of charge. Batteries with cells that are too far out of balance are typically identified and disabled, leading to lower pack lifetime. A number of factors contribute to cell imbalance, such as aging characteristic differences of the cells or uneven temperature distribution within the system.

There are a number of disadvantages imposed by cell balancing. All cells must have the same or substantially similar capacities and the number of cells in a battery has to be a multiple of the number of cells in series. The temperature gradient across the battery must be constrained to prevent different rates of cells aging. Historically, cell imbalance has been managed by using cell selection to construct batteries. Cell selection includes matching cells that have the same or substantially similar capacities for use in a battery.

Accordingly, there is a need in the art for an improved cell configuration and cell management system that accurately measures state of charge without user initiated rest periods, avoids cell balancing requirements and has improved battery lifetime.

BRIEF SUMMARY OF THE INVENTION

Generally, one embodiment of the present invention may be a power source having multiple cells connected in parallel to a common node or power supply point, such as a power bus in a computing device. An exemplary embodiment of the present invention may take the form of a power source having individual cells configured in parallel with one another and a dedicated controller for each of the individual cells. Each of the dedicated controllers may be operationally or directly connected on a one to one basis to each of the respective cells. Further, each controller may be operationally and/or directly connected in series with a cell and may be located between the cell and a common node. Thus, the cells are in parallel in the sense that no cells are in series with another cell, although other electrical elements may be interconnected in series with any of the cells. The embodiment may permit, for example, increased individual control of each cell. Moreover, a cell may be an abstraction of an energy source such as, but not limited to, an electromechanical cell.

In another embodiment of the present invention, buck-boost controllers may be used in the power source. The parallel configuration of the cells within the power source may allow for increased individual control of the cells and also may eliminate the need for cell balancing. By eliminating the need for cell balancing, manufacturing tolerances may be relaxed as the cells within a power source need not have similar capacities. Further, the state of charge of the cells within a power source no longer require balancing.

Additionally, the parallel configuration of the cells and the buck-boost controllers within the power source may allow for greater control of both cell charging and cell discharging. For example, when a cell is discharging and the cell voltage is lower than the required output voltage, the buck-boost controller may enter a boost mode and amplify the voltage to satisfy the load. Also, when a cell is discharging and the cell voltage is higher than the required output voltage, the buck-boost controller may enter a buck mode and reduce the voltage to appropriately supply the load. As another example, when a cell is charging and the output voltage is higher than the cell voltage, the buck-boost controller may enter a reverse buck mode and supply the cell with charging current. The reverse buck mode is similar to the discharging boost mode with the exception that the current flows from the common node to the cell. The individual control of the cells may allow the cells to be fully or substantially charged and discharged, thus maximizing the capacity and runtime of the power source.

By configuring every cell only in parallel with all the other cells (such that no cell is in series with any other cell), another embodiment may be used for isolating one or more cells from the other cells. The ability to isolate one cell provides a number of advantages. One such advantage may be exemplified by allowing a cell to rest before measuring the open circuit voltage of the cell. Isolating a cell may allow the state of charge of the cell to be calibrated using the open circuit voltage technique without resting the entire power source. Further, periodically isolating cells to measure the open circuit voltage and to calibrate the cell's state of charge constrains the state of charge uncertainty that may grow when using the coulomb counting technique. When a cell is isolated for the state of charge measurement, the cell may be allowed to rest. Cells that are allowed to rest may have increased capacity compared to continually discharging cells.

Cell isolation may also indirectly yield extended battery runtime, which may result directly from an increase in the amount of charge available. For example, a substantially or fully discharged cell may be isolated from the other cells while the other cells continue to provide power to the output. This may result in the power source providing power until the last cell is depleted, as opposed to only providing power until the first cell is depleted. An additional advantage is the ability to replace individual cells in the power source.

Furthermore, certain embodiments may allow for greater freedom in power source design and system design. The parallel configuration of the components within the power source may reduce the constraints on cell configurations, thus permitting various cell configurations within the power source. For example, the power source design may contain different sized cells with different cell capacities to fulfill different conditions such as weight requirements, capacity or runtime requirements. Another result of the capability to vary power source configurations may be the location or placement of the power sources within the system itself. For example, the power sources may be configured in different sizes and/or may be used to fill the available space in the system itself. Furthermore, the power sources may be placed non-adjacently within the system.

It should be noted that any embodiment of the present invention may be used with a variety of power sources and in a variety of apparatuses such as, but not limited to, computing devices or electronic devices. The present invention may be used with practically any apparatus requiring power including but not limited to handheld electronic devices and computing devices. Accordingly, embodiments of the present invention may be employed in computer equipment and/or peripherals, electronics devices, battery-operated handheld devices and so on.

Another embodiment of the present invention takes the form of a power source including at least two individual cells, each of the at least two individual cells configured only in parallel with all other individual cells, at least two controllers, wherein each of the at least two individual controllers is operationally connected on a one to one basis to each of the at least two individual cells and a common node wherein each of the at least two individual controllers and each of the at least two individual cells is operationally connected to the common node. The embodiment may also include a power source wherein each of the at least two controllers is a buck-boost controller and each buck-boost controller is operationally connected to a power bus and operationally connected to each corresponding cell of the at least two individual cells.

Still another embodiment of the present invention may include a method for isolating cells in a power source, including configuring at least two individual cells in parallel, wherein each individual cell is configured only in parallel with every individual cell, dedicating each controller of at least two controllers to each cell of the at least two individual cells such that each controller has a one to one correspondence with each individual cell and is operationally connected to each individual cell and connecting each individual controller and each individual cell to a common node.

These and other advantages and features of the present invention will become apparent to those of ordinary skill in the art upon reading this disclosure in its entirety.

DETAILED DESCRIPTION OF THE INVENTION

Generally, one embodiment of the present invention takes the form of a power source having multiple cells connected in parallel to a common node or power supply point, such as a power bus in a computing device. An exemplary embodiment of the present invention may be a power source with individual cells configured in parallel with one another and a dedicated controller for each of the individual cells. Each of the dedicated controllers may be operationally or directly connected on a one to one basis to each of the respective cells. Further, each controller may be operationally and/or directly connected in series with a cell and may be located between the cell and a common node. Thus, the cells are in parallel in the sense that no cells are in series with another cell, although other electrical elements may be interconnected in series with any of the cells. The embodiment may permit, for example, increased individual control of each cell.

The parallel configuration of the cells within the power source may allow for increased individual control of the cells and also may eliminate the need for cell balancing. An advantage to eliminating cell balancing is that manufacturing tolerances may be relaxed as the cells within a power source need not have similar capacities. Further, the state of charge may not require balancing within a power source.

Buck-boost controllers may be used in the power source. Additionally, the parallel configuration of the cells and the buck-boost controllers within the power source may allow for greater control of both cell charging and cell discharging. For example, when a cell is discharging and the cell voltage is lower than the required output voltage, the buck-boost controller may enter a boost mode and amplify the voltage to meet the load requirements. Also, when a cell is discharging and the cell voltage is higher than the required output voltage, the buck-boost controller may enter a buck mode and reduce the voltage to appropriately supply the load. Moreover, when a cell is charging and the output voltage is higher than the cell voltage, the buck-boost controller may enter a reverse buck mode and supply the cell with charging current. The reverse buck mode is similar to the discharging boost mode with the exception that the current flows from the common node to the cell. The individual control of the cells may allow the cells to be fully or substantially charged and discharged, thus maximizing the capacity and runtime of the power source.

By configuring every cell only in parallel with all the other cells (such that no cell is in series with any other cell), the embodiment may isolate one or more cells from the other cells. The ability to isolate one cell provides a number of advantages. One such advantage may be exemplified by allowing a cell to rest before measuring the open circuit voltage of the cell. Isolating a cell may allow the state of charge of the cell to be calibrated using the open circuit voltage technique without isolating the entire power source. Further, periodically isolating cells to measure the open circuit voltage and to calibrate the cell's state of charge constrains the state of charge uncertainty that may grow when using the coulomb counting technique. When a cell is isolated for the state of charge measurement, the cell may be allowed to rest. Cells that are allowed to rest may have increased capacity compared to continually discharging cells.

Another feature of cell isolation is extended battery runtime, which may result from an increase in the amount of charge available. For example, a substantially or fully discharged cell may be isolated from the other cells while the other cells continue to provide power to the output. This may result in the power source providing power until the last cell is depleted as opposed to only providing power until the first cell is depleted. An additional feature is the ability to replace a cell in the power source singly, which may result in an increased lifetime of the power source in its entirety.

Furthermore, certain embodiments may allow for greater freedom in power source design and system design. The parallel configuration of the components within the power source may reduce the constraints on cell configurations, thus permitting various cell configurations within the power source. For example, the power source design may contain different sized cells with different cell capacities to fulfill different conditions such as weight requirements, capacity or runtime requirements. Another result of the capability to vary power source configurations may be freedom in the location or placement of the power sources within the system itself. In another example, the power sources may be configured in different sizes and/or may be used to fill available space in the system rather than the system being designed around the placement of the power sources. Moreover, the power sources may be placed non-adjacently within the system.

It should be noted that any embodiment of the present invention may be used with a variety of power sources and in a variety of apparatuses such as, but not limited to, computing devices or electronic devices. The present invention may be used with practically any apparatus requiring power including but not limited to handheld electronic devices and computing devices. Accordingly, embodiments of the present invention may be employed in computer equipment and/or peripherals, electronics devices, battery-operated handheld devices and so on.

Figure 1:
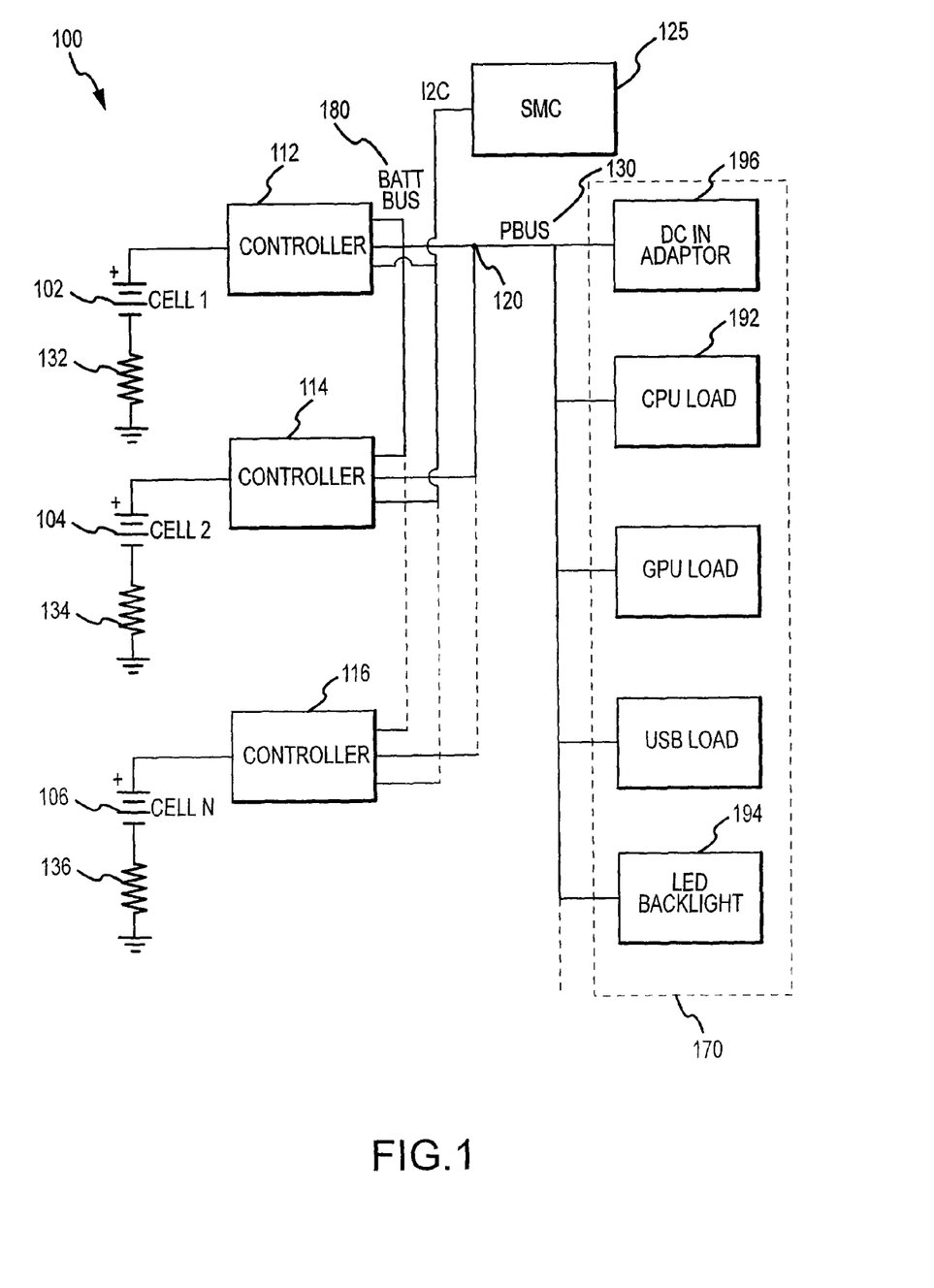
FIG. 1 depicts a block diagram of an exemplary embodiment of the present invention.

FIG. 1 depicts a block diagram of an exemplary embodiment 100 of the present invention. Multiple cells 102, 104, 106 may be operationally or directly connected in parallel with all other cells. Further, as shown in FIG. 1, none of the cells 102, 104, 106 are operationally or directly connected in series with any other cell. For example, in FIG. 1, cell 102 may be operationally connected only in parallel with all other cells, such as cell 104 and cell 106. FIG. 1 contains three cells for exemplary purposes only and is not intended to place a limit on the number of cells that may be used in a power source. A power source may contain any number of cells as required to satisfy the power draw of a load. Furthermore, all cells 102, 104, 106 in the embodiment 100 may be operationally or directly connected to a common node 120. Each of the cells 102, 104, 106 in embodiment 100 may also be connected to optional individual sense resistors, such as sense resistors 132, 134, 136, that may be used to measure the current of the respective cells 102, 104, 106. In certain embodiments, each sense resistor, such as sense resistors 132, 134, 136, may be operationally or directly connected between the respective ground and cell in each of the respective branches of the power source containing a ground and a cell.

In embodiment 100, cells 102, 104, 106 may each be operationally or directly connected to individual dedicated controllers. One exemplary embodiment of a controller will be discussed in more detail with respect to FIG. 3, below. In certain embodiments of the present invention, each controller may be a buck-boost controller. For example, in FIG. 1 cell 102 may have a dedicated buck-boost controller 112, while cell 104 may have a second dedicated buck-boost controller 114 and cell 106 may have a third dedicated buck-boost controller 116. The number of buck-boost controllers in FIG. 1 is not intended as a limitation but merely an example for explanatory purposes. Buck-boost controller 112, buck-boost controller 114 and buck-boost controller 116 may be operationally or directly connected in parallel with one another and each of the buck-boost controllers may be operationally or directly connected to a common node 120. The buck-boost controllers 112, 114, 116 may also be operationally or directly connected to a battery bus 180 as depicted in FIG. 1. Additionally, the buck-boost controllers may be operationally or directly connected to a system microcontroller 125.

Generally, the buck-boost controllers 112, 114, 116 of embodiment 100 may be switching DC to DC converters. Generally, a buck-boost controller may be a switch mode power supply that may function either as a boost converter or a buck converter depending on at least the demand of the load and the voltage of the cells. A standard buck-boost controller may use an inductor that accumulates power when the buck-boost controller is in the on state or when the appropriate switch is closed. When the buck-boost controller switch is closed, the input voltage source may be connected to the inductor. Accordingly, when a standard buck-boost controller has an open switch or is in the off state, the power may transfer from the inductor to the load.

In FIG. 1, buck-boost controllers 112, 114, 116 may act to amplify or reduce the voltage of the power source based on the power demand from the load. Depending on whether the source voltage is greater or less than the voltage demand of the load, the source voltage may need to be amplified or reduced by a buck-boost controller.

Generally, when a buck-boost controller enters the boost mode, the buck-boost controller may amplify the voltage of the respective cell to provide the power specified by a system microcontroller 125. (A more detailed description of the system microcontroller is given below.) In embodiment 100, one or more of the buck-boost controllers 112, 114, 116 may enter the boost mode when the voltage of one of the respective cells 102, 104, 106 is less than the power demand of the load 170. Alternatively, when a buck-boost controller enters its buck mode, it may reduce the voltage of the respective cell to provide the voltage specified by the system microcontroller 125. Additionally, in FIG. 1, one or more of the buck-boost controllers 112, 114, 116 may enter the buck mode when the voltage of one of the cells 102, 104, 106 respectively is greater than the power draw of the load 170. A buck-boost controller may also enter a reverse buck mode when the voltage of a cell is less then the output voltage. A more detailed description of the buck-boost controller states is given with respect to FIG. 2, below.

It should be noted that the number of devices constituting the load 170 in FIG. 1 is not intended as a limitation, but merely as an example for explanatory purposes. Generally, there may be any number of devices that constitute the load and that require power. The load may also include any number of devices that require power and any number of devices that provide power to the power source for charging. Further, the embodiment 100 may have a load consisting of a single device.

In FIG. 1 each of the buck-boost controllers 112, 114, 116 may control the current flow in or out of the cells 102, 104, 106 respectively. Additionally, each of the buck-boost controllers 112, 114 or 116 may allow the cells 102, 104, 106 respectively to charge or discharge and may also allow for the isolation of the cells 102, 104, 106. Each of these functions will be discussed in more detail with respect to FIG. 2, below.

A system microcontroller 125 may be operationally or directly connected to each of the individual buck-boost controllers 112, 114, 116. In the embodiment 100, the system microcontroller 125 may direct the individual buck-boost controllers 112, 114, 116 to perform a number of functions. For example, the system microcontroller 125 may direct the buck-boost controllers 112, 114, 116 to supply constant power to the load or alternatively could direct the buck-boost controllers 112, 114, 116 to isolate certain cells. Continuing the example, a cell may be isolated because of a compromised cell capacity. In this case, the system microcontroller 125 may direct a buck-boost controller 112, 114, 116 to isolate the respective cell. By isolating the cell with a compromised cell capacity, the problem of early undervoltage shutdown of the power source may be avoided thus allowing an extended runtime of the power source. In another example, if the cells in a power source are charging and a cell has a depleted capacity then isolation of the depleted capacity cell may also allow for extended runtime of the power source. When charging, a cell need not reach its maximum charge level simultaneously with the other cells in the power source allowing other cells to achieve their maximum charge level regardless of capacity or initial state of charge.

Additionally, the system microcontroller 125 may direct the respective buck-boost controllers to isolate the cells 102, 104, 106 systematically and one at a time, in a round-robin fashion. When the cells 102, 104, 106 are systematically isolated, the isolated cell may be allowed to rest, thus permitting an open circuit voltage measurement of the rested cell which may be used to estimate the state of charge of the respective cell independent of any previous measurements. For example in FIG. 1, the system microcontroller 125 may manage the isolation of the cells by directing buck-boost controller 112 to isolate cell 102 first, then directing buck-boost controller 114 to isolate cell 104 second and then directing buck-boost controller 116 to isolate cell 106 last. By isolating only one cell at a time, the cell voltage provided to satisfy the load may be distributed between the other cells while the isolated cell rests and has its open circuit voltage measured and accordingly, its state of charge calibrated. Cell isolation is discussed in more detail with respect to FIG. 2, below.

In the embodiment, common node 120 may be connected to a power bus 130. Thus, cells 102, 104, 106 and controllers 112, 114, 116 may be operationally or directly connected to the power bus 130. The power bus 130 may be operationally or directly connected to a load 170. The load may include any variety of devices that may provide power to the power source or may include any variety of devices that may require power from the power source or any combination thereof.

The general configuration of the embodiment 100 in FIG. 1 is not intended as a limitation, but merely as an example for explanatory purposes. Although embodiment 100 represents all the cells on one side of the power bus 130 and all the devices comprising the load connected to the power bus 130 on the opposite side from the cells, other configurations are possible. Other configurations may include, but are not limited to, the cells being located in different parts of the system so long as the cells are connected to the respective dedicated local controllers and the power bus 130. Further, the load may also be located in different parts of the system as long as the devices comprising the load are all connected to the power bus 130.

As demonstrated in FIG. 1, the power source may be connected to an exemplary load 170 with a variety of devices including, but not limited to, a central processing unit (hereinafter "CPU") 192, a light emitting diode (hereinafter "LED") backlight 194 and a DC-in adaptor 196. Depending on the power demand of the load 170, the power from the power source may need to be amplified or reduced accordingly. Further, the power demand of the load 170 may be the aggregate power demand of the devices that comprise the load 170. For example in FIG. 1, the power bus may be connected to a CPU 192 and an LED backlight 194. However, if the power demand of the load 170 is being provided to the CPU 192 then the power from the power source may require reduction. Alternatively, if the power demand of the load 170 is being provided to the LED backlight 194, the power from the power source may require amplification. Furthermore, the power source may also draw power (i.e., the power source may charge) from devices that are connected to the power bus 130. For example in FIG. 1, a DC-in adaptor 196 may be connected to the power bus 130. The cells 102, 104, 106 may be charged by the DC-in adaptor 196. When cells 102, 104, 106 are charging, buck-boost controllers 112, 114, 116, respectively, may enter the reverse buck mode. Further examples will be given in more detail with respect to FIG. 2, below.

Generally, the power from the cells 102, 104, 106 may be combined in any number of ways to provide the requisite power to the load 170. The power provided by the cells 102, 104, 106 to the load 170 may be provided in substantially equal amounts from each cell, in any disproportionate amount allocated between the cells, or the power may be provided substantially from a single cell. For example, approximately 5% of the power may be provided by cell 102, approximately 5% of the power may be provided by cell 104 and approximately 90% of the power may be provided by cell 106.

The system microcontroller 125 may direct the buck-boost controllers 112, 114, 116, to provide a specified power from each respective cell 102, 104, 106. The buck-boost controllers 112, 114, 116 may control the power provided by each of the respective cells 102, 104, 106 to the output power. For example, if cells 102, 104, 106 are imbalanced or have different capacities, the power draw may be different from each cell. For example, in FIG. 1, cell 102 may have 50% capacity remaining and cells 104 and 106 may each have 25% capacity remaining. The power provided to the power source may be allocated according to the capacities of the cells. In this example, buck-boost controller 112 may require 50% of the power draw from cell 102, buck-boost controller 114 may require a 25% power draw from cell 104 and buck-boost controller 116 may require a 25% power draw from cell 106. Additionally, the cell voltage may also need to be amplified or reduced according to the power draw requirement and any change in cell capacity.

Figure 2:
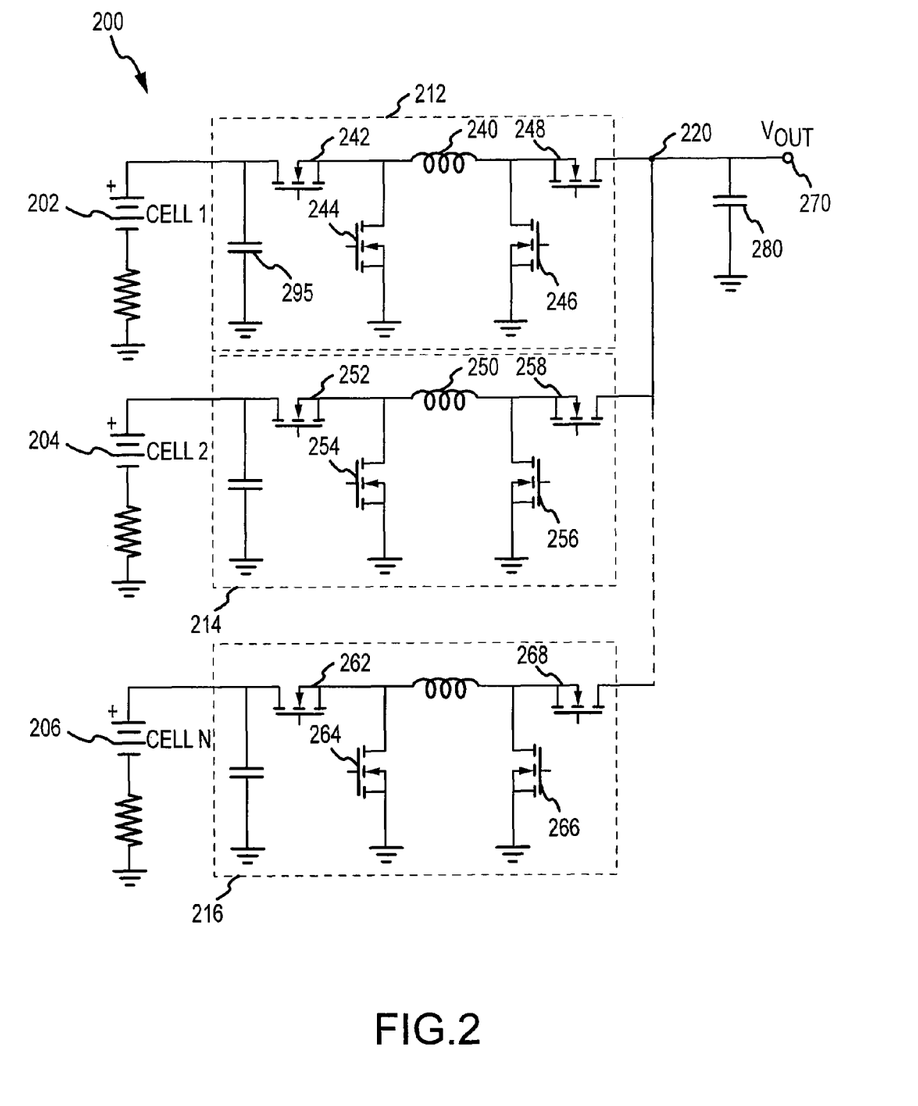
FIG. 2 depicts a schematic of an exemplary embodiment of the present invention.

FIG. 2 depicts a schematic of another exemplary embodiment 200 of the present invention. Similar to FIG. 1, every cell may be operationally or directly connected in parallel with all other cells, thus cell 202 may be operationally or directly connected only in parallel with cells 204 and 206. The embodiment 200 also depicts buck-boost controllers such as buck-boost controllers 212, 214, 216. A buck-boost controller, such as buck-boost controller 212 may have individual elements which include, but are not limited to, field effect transistors (hereinafter "FETs") 242, 244, 246, 248, inductor 240, capacitor 295 and so forth. The individual buck-boost controllers 212, 214, 216 may each be dedicated to an individual cell of the cells 202, 204, 206 on a one to one basis. The buck-boost controllers 212, 214, 216 as well as the cells 202, 204, 206 may be operationally or directly connected to a common node 220. In one embodiment the common node 220 may be operationally or directly connected to an output voltage 270.

The buck-boost controllers 212, 214, 216 may allow for increased control of both discharging and charging of the cells 202, 204, 206. For example, cell 202 may be discharging and have a lower voltage than the output voltage 270. In such a case, buck-boost controller 212 may enter its boost mode. In boost mode when the voltage of cell 202 is amplified, FET 242 is on (E.g., FET 242 switch is closed) and FET 244 is off (E.g., FET 244 switch is open). Additionally, FET 246 and FET 248 switch, as necessary, to drive current from cell 202 to the output voltage 270. Also, the gates of FETs 242, 244, 246, 248 may be connected to a FET controller which is discussed in more detail with respect to FIG. 3 below. When FET 242 is on, cell 202 may be connected to inductor 240. Further, when FET 242 is on current may be allowed to flow between the drain of FET 242 and the source of FET 242. As a result, cell 202 is connected to inductor 240, thereby increasing the current of inductor 240 and resulting in the accumulation of power in inductor 240. In this state, capacitor 280 may also supply charge to the output voltage 270.

In another example, when cell 202 is discharging, cell 202 may have a higher voltage than the output voltage 270. In this state, buck-boost controller 212 enters its buck mode and the voltage of cell 202 may be reduced. In buck mode, FET 248 is on (E.g., FET 248 switch is closed), FET 246 is off (E.g., FET 246 switch is open), and FET 242 and FET 244 switch as necessary to drive current from cell 202 to the output voltage 270. When FET 248 is on, current may be allowed to flow between the drain of FET 248 and the source of FET 248. Further, the inductor current has no path to ground through FET 246. In this state, capacitor 280 supplies charge to the output voltage 270.

In yet another example, cell 202 may be charging. In this state, buck-boost controller 212 may enter its reverse buck mode. When cell 202 is charging, the output voltage 270 may be higher than the voltage of cell 202. The reverse buck mode is similar to the discharging boost mode with the exception of the current flow from common node 220 to cell 202. When buck-boost controller 212 is in its reverse buck mode, current flows from the output voltage 270 to cell 202. Additionally, in this mode, FET 242 is on and FET 244 is off, while FET 246 and FET 248 alternately switch to drive current from the output voltage 270 to cell 202. In reverse buck mode, capacitor 295 may supply power to cell 202.

Another facet of certain embodiments may be the isolation of individual cells from the load. The individual cells may also be electrically isolated from a common node which may be operationally or directly connected to a power bus. In FIG. 2, cell 202 may be isolated from the output voltage 270. When cell 202 is isolated, both FET 242 and FET 248 may be turned off. Any cell may be isolated in the embodiment 200 by turning off the appropriate corresponding FETs. For example, cell 204 may be isolated from the output voltage 270 by turning off both FET 252 and FET 258. In another embodiment, a cell may be isolated while the other cells continue to provide power to the output voltage. In this state, the open circuit voltage of the isolated cell may be measured. The open circuit voltage measurement may then be used to calibrate the state of charge of the isolated cell.

In addition, isolating a cell may extend battery runtime. When isolating a cell that may be fully or near fully discharged, the other cells may continue to provide power to the load. As a result, the battery runtime may be increased, as the fully or near fully discharged cells are isolated. The isolation of the substantially or fully depleted cells may allow power to be supplied until the last cell is substantially or fully depleted. For example, referring to FIG. 2, if cell 202 becomes substantially or fully depleted, it may be isolated while cells 204 and 206 continue to provide power to the output voltage 270. When cell 204 becomes substantially or fully depleted, it may also be isolated while cell 206 continues to provide power to the output voltage 270. Power may then be supplied until cell 206 is substantially or fully depleted.

Figure 3:
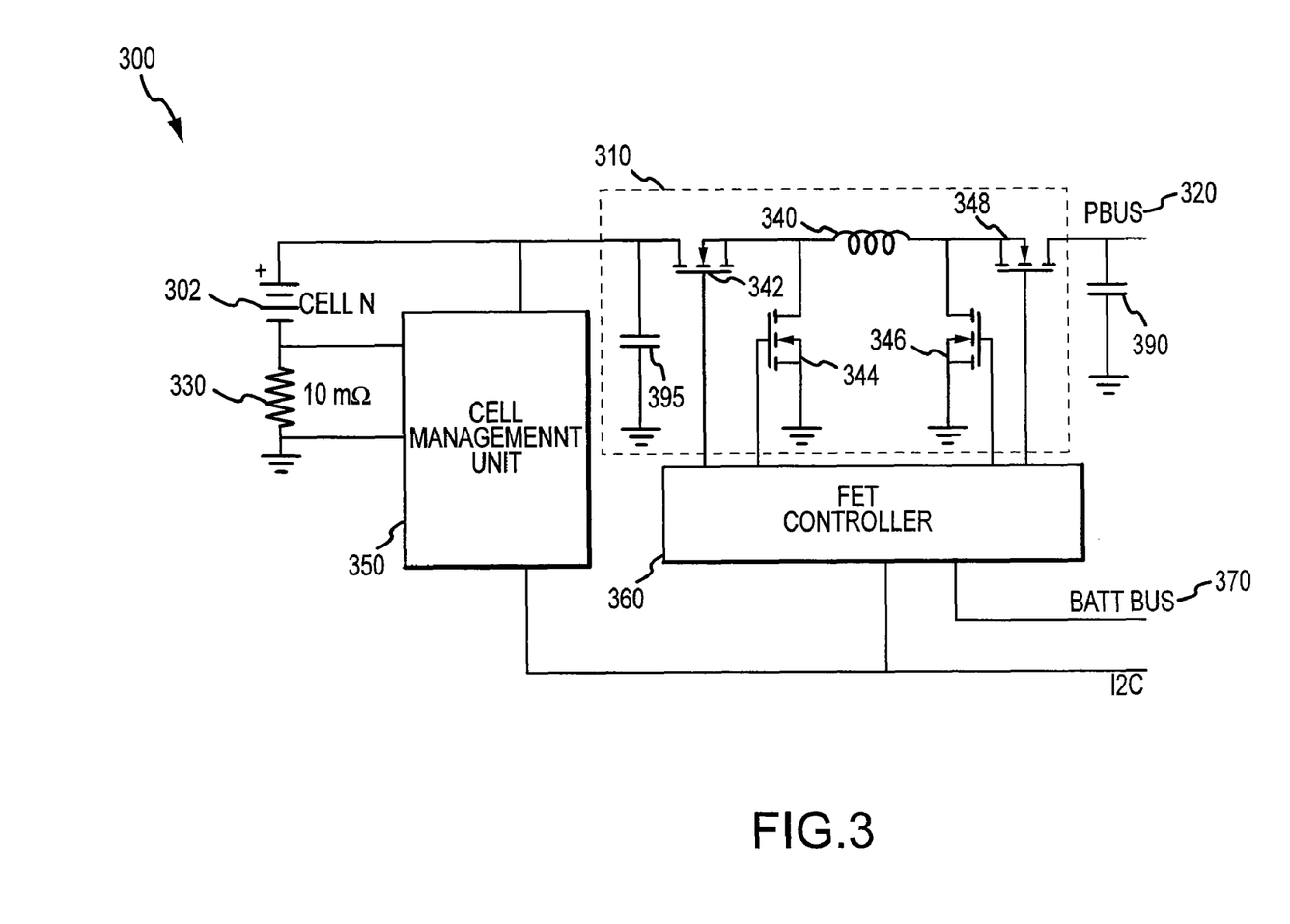
FIG. 3 depicts an exemplary embodiment of a controller.

FIG. 3 depicts a schematic of another exemplary embodiment 300 including a controller 310. The embodiment 300 may include a buck-boost controller 310. As depicted in FIG. 3, the buck-boost controller 310 may include, but is not limited to, multiple elements such as FET 342, FET 344, FET 346, FET 348, inductor 340 and capacitor 395. Generally, the FETs presented in FIG. 1, FIG. 2 and FIG. 3, are n-channel FETs. Alternative embodiments may use p-channel FETs or any other type of transistor or switch that is appropriate. Also, the figures are not intended to limit the present invention to a particular type of switch or transistor.

Embodiment 300 may include a FET controller 360. As depicted in FIG. 3, the gates of FET 342, FET 344, FET 346 and FET 348 may be connected to the FET controller 360. The embodiment 300 may also have a cell management unit 350. In one embodiment, cell management unit 350, FET controller 360, FETs 342, 344, 346, 348, inductor 340 and capacitors 390 and 395 may all be integrated into a single integrated circuit in the embodiment 300.

Buck-boost controller 310 may facilitate charging or discharging the cell 302. For example, buck-boost controller 310 may charge or discharge cell 302 by controlling the switching of FETs 342, 344, 346 and 348 as discussed with respect to FIG. 2. Additionally, as discussed with respect to FIG. 2, buck-boost controller 310 may allow for the isolation of cell 302 from the power bus 320.

As shown in FIG. 3, buck-boost controller 310 may have an optional sense resistor 330 which may be used to measure the current of cell 302. Additionally, if cell 302 is not rested, sense resistor 330 may also be used to estimate the state of charge of cell 302 by accumulating the amount of charge entering or leaving cell 302. The cell management unit 350 may also measure the voltage, current and temperature of cell 302, which may allow the cell management unit 350 to determine the impedance, capacity and remaining charge of cell 302. FET controller 360 may measure the voltage and current of cell 302. Furthermore, FET controller 360 may read the power of the other cells in the power source through the battery bus 370, where the battery bus 370 is connected to the cells and FET controller 360.

Figure 4:
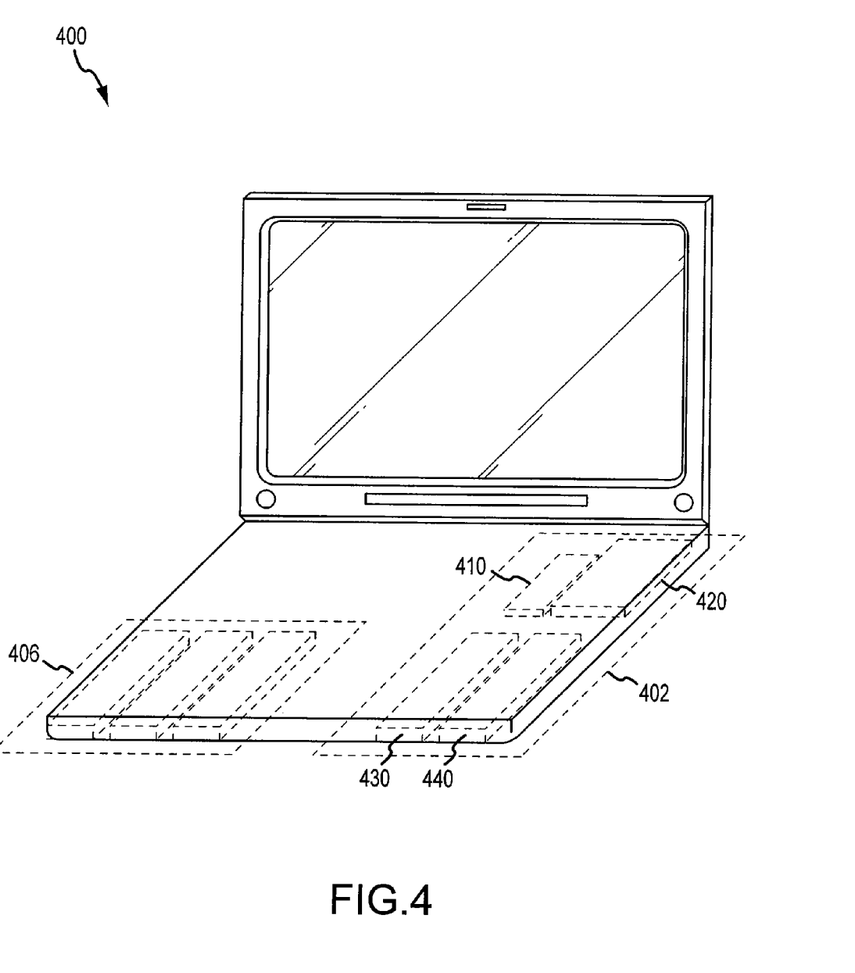
FIG. 4 depicts an embodiment of a system with multiple power sources.

FIG. 4 depicts another embodiment of a system 400. The system 400 illustrates one of any number of ways that the cells may be distributed both in a power source and in a system. The system 400 may have cells distributed non-adjacently throughout the system 400. One factor that makes non-adjacent distribution of the cells possible is the elimination of cell balancing. Further, due to the various possibilities of cell locations, the thermal gradient requirement may be eliminated or at least reduced in importance from the design constraints.

Each cell within the system 400 may have a different cell capacity from all other cells within the system 400. One cell may have a different cell capacity then all other cells, or a few cells may have different cell capacity then all other cells, or any combination thereof is also possible. For example, a system may have five cells. In this example, it is possible that all five cells may have different cell capacities from each other, one of the five cells may have a different cell capacity from the others while the remaining four cells have the same capacity as each other, or two cells may have the same cell capacity while the other three cells have a different cell capacity from the two cells and also from each other. The previous combinations are not meant as a limitation, but instead as an example for explanatory purposes. Further, the cell capacities of the individual cells within a given power source may be different from the other cells within the same power source. For example, in power source 402, cell 420 may have a different cell capacity than cell 410. Also, cells 410 and 420 may have different cell capacities then cells 440 and 430. It is possible for all the cells within power source 402 to have the same cell capacity, for one of the cells to have a different cell capacity then the other cells, or any other combination of cell capacities to exist within a power source.

The cell capacities of the cells within power source 402 are not limited by cell balancing and therefore are not required to have substantially similar capacities. Thus, certain embodiments may provide increased design possibilities for power source layout within a system 400 or electronic device due to the lack of cell balancing. For example, the system 400 may be designed to contain fewer total cells in the system 400 to reduce the overall weight of the system 400. The system 400 may also have an increased number of cells in the system 400 to facilitate increased runtime. Additionally, the system 400 may have a second power source 406 located in a non-adjacent position to power source 402 in the system 400. Continuing the example, power source 406 may have only three cells configured in a parallel configuration. Further, if power source 406 only has three cells, none of the cells necessarily must have the same capacity. The example of system 400 is not meant to limit the number of power sources or the number of cells within the power source in any way, but is merely provided for explanatory purposes.

Although the present invention has been described with respect to particular apparatuses, configurations, components, and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

We claim:

1. A power source comprising:
    a plurality of individual cells, each of the plurality of individual cells configured in an electrically parallel configuration with all other individual cells;
    a plurality of controllers, wherein each of the plurality of controllers is communicatively coupled to one of the plurality of individual cells;
    a system controller coupled to the plurality of controllers; and
    a feedback loop that includes the system controller, the system controller configured to connect each cell of the plurality of cells to a power bus to control the discharge of each of the plurality of cells.

2. The power source of claim 1 wherein:
    each of the plurality of controllers comprises a buck-boost controller; and
    each buck-boost controller is operationally connected to the power bus.

3. The power source of claim 1 wherein the feedback loop including the system controller connects the cell with the highest remaining capacity of the plurality of individual cells directly to the power bus.

4. The power source of claim 1 wherein power is discharged from each cell corresponding to a respective fraction of the total remaining capacity of each cell of the plurality of individual cells.

5. The power source of claim 1 wherein each of the plurality of individual cells is alternately isolated.

6. The power source of claim 5 further wherein the alternate isolation of each cell of the plurality of individual cells automates a calibration of state of charge measurements.

7. The power source of claim 1 wherein a cell with a lowest charge level is isolated.

8. The power source of claim 1 wherein the plurality of cells are distributed in a system and at least one cell of the plurality of cells is located non-adjacent to the other cells in the system.

9. A method for isolating cells in a power source, comprising:
    configuring a plurality of individual cells in an electrically parallel configuration, wherein each individual cell is configured in a parallel configuration with every other individual cell;
    dedicating one controller to each cell of the plurality of individual cells such that each controller is operationally connected to its corresponding individual cell;
    communicatively coupling each individual cell with a system controller; and
    selectively coupling one or more of the plurality of individual cells to a power bus via a feedback loop that includes the system controller.

10. The method of claim 9, further comprising discharging power from each of the plurality of individual cells in a ratio corresponding to a respective fraction of a total remaining capacity of each cell.

11. The method of claim 9, further comprising alternately isolating each cell of the at least two individual cells, wherein the alternate isolation of each cell of the plurality of individual cells automates a calibration of state of charge measurements.

12. The method of claim 9, further comprising isolating a cell with the least amount of charge of the plurality of individual cells.

13. The method of claim 9 wherein at least one of the cells of the plurality of individual cells used in a system has a different cell capacity then the other cells.

14. The method of claim 9 further comprising:
distributing the plurality of individual cells in a system; and
locating at least one of the cells in the plurality of cells non-adjacently to the other individual cells.

15. A system comprising:
a load;
a plurality of independent power sources configured in an electrically parallel configuration and selectively coupleable to the load via a power bus, wherein each power source comprises:
a power cell;
a buck-boost controller coupled to the power cell; and
a cell management unit coupled to the power cell;
a system microcontroller coupled to the cell management unit of each of the plurality of independent power sources, wherein the system microcontroller is configured to receive state information from each of the plurality of independent power sources and selectively couple one or more of the plurality of independent power sources to the load.

16. The system of claim 15 wherein at least one of the buck-boost controllers comprises a plurality of field effect transistors.

17. The system of claim 16 wherein at least one buck-boost controller is coupled to an FET controller.

18. The system of claim 17 wherein:
at least one FET controller is in communication with each other FET controller via a battery bus; and
at least one FET controller is in communication with the system microcontroller.

19. The system of claim 15 wherein at least one cell management unit is configured to determine the impedance, capacity and remaining charge of its respective independent power source.

20. The system of claim 17 wherein at least one of the plurality of independent power sources comprises at least one device configured to estimate one of a charge of the power cell, a current of the power cell, a voltage of the power cell, or a temperature of the power cell.

* * * * *